United States Patent [19]

Kuo et al.

[11] Patent Number: 5,571,221
[45] Date of Patent: Nov. 5, 1996

[54] AUTOMOBILE WINDSHIELD WIPER PROTECTION DEVICE

[76] Inventors: Chunn-Cherh Kuo, 4F, No. 155-2, Sec. 1, Tsu-Chiang Rd., Sanchung, Taipei; Chung-Gang Shieh, 3F, No. 84, Sec. 2, Pa-Teh Rd., Taipei, both of Taiwan

[21] Appl. No.: 609,555

[22] Filed: Mar. 1, 1996

[51] Int. Cl.$^6$ ................................. B60S 1/34; B60S 1/32
[52] U.S. Cl. .................... 15/250.19; 15/257.01; 15/250.16; 15/250.351
[58] Field of Search ............... 15/250.19, 250.351, 15/250.16, 250.17, 250.202, 250.203, 250.001, 250.23, 257.01

[56] References Cited

U.S. PATENT DOCUMENTS

| | | | |
|---|---|---|---|
| 2,784,438 | 3/1957 | Petersen | 15/250.19 |
| 4,866,811 | 9/1989 | Kuhbauch | 15/250.19 |
| 5,487,204 | 1/1996 | Nelson | 15/250.19 |

FOREIGN PATENT DOCUMENTS

| | | | |
|---|---|---|---|
| 3731921 | 12/1988 | Germany | 15/250.19 |
| 4235395 | 4/1994 | Germany | 15/250.19 |
| 185658 | 9/1985 | Japan | 15/250.19 |
| 60354 | 3/1986 | Japan | 15/250.19 |
| 173355 | 7/1987 | Japan | 15/250.19 |
| 162616 | 6/1993 | Japan | 15/250.19 |

*Primary Examiner*—Gary K. Graham
*Attorney, Agent, or Firm*—Ladas & Parry

[57] ABSTRACT

The present invention relates to an automobile windshield wiper protection device for raising the windshield wiper to be spaced from the windshield, thereby reducing degradation of the rubber wiper blade which are normally in contact with the windshield heated by the sun, and preventing dirts from accumulating between the wiper blade and the windshield. The present invention includes a housing to be disposed on the windshield wiper. The housing accommodates a DC motor for actuating a driving mechanism. The driving mechanism includes a telescopic pusher rod capable of effecting a linear motion, and the pusher rod urges against the windshield for raising the wiper blade. A double pole double throw switch is incorporated in the circuit, and is electrically connected to the ignition system of the vehicle, such that the wiper blade is lowered or raised in response to the switching on and off of the ignition system.

7 Claims, 4 Drawing Sheets

5,571,221

AUTOMOBILE WINDSHIELD WIPER PROTECTION DEVICE

BACKGROUND OF THE INVENTION

The present invention relates to an automobile windshield wiper protection device and, in particular, to such a protection device wherein a motor provided on the windshield wiper for driving a pusher rod is used in conjunction with a cushion Dad such that when the wiper is not in use, the rubber wiper blade is urged away from the windshield so as to extend the life span of the blade.

It is known that there are more fair and cloudy days than rainy days worldwide. The automobile windshield wipers are intended for rainy days for removing dirts and water off the windshield such that the driver may have a clear vision ahead. Due to the fact that fair and cloudy days are relatively fewer in number than the rainy days, windshield wipers are often seen rested on the windshield for long period of time, which inevitably shortens the life span of the windshield wipers. The reason is that the high temperature experienced by the windshield as subject to the sun tends to heat and soften the rubber wiper blades, causing deformation, degradation, and even damage of the blades. Consequently, the windshield wipers will no longer perform the normal function of removing water and dirts trapped on the windshield. The most important part of a windshield wiper is the wiper edge. Since the wiper edge is in direct contact with the windshield which is often subject to high temperature caused by the sun, the wiper edge deteriorates rapidly. Accordingly, it is desirable to avoid the wiper blade from contacting the windshield in shiny days so as to lengthen the life span of the wiper.

Therefore, there is a need to have a device provided on the automobile to raise the wiper blade so that it is not in contact with the windshield when it is not in use. It is at present available on the market a support frame which is mountable on the windshield. When the windshield wiper is not in use, the user can manually move the wiper arm to place the same on the support frame, thereby preventing the wiper blade from contacting the windshield. Such a device, however, has the following disadvantages: (a) the driver or user may forget or too lazy to support the wiper arm on the device; (b) once in place, it is not possible to actuate the windshield wiper quickly in the even of a shower or sudden rain; and, (c) once the wiper arm is in place, if the switch in electrical circuit with the windshield wiper is turned on accidentally, the wiper actuation motor, driving means, wiper arm, and the support frame itself may be damaged.

SUMMARY OF THE INVENTION

The object of the present invention is to provide an automatic wiper protection device which may overcome the aforementioned defects found in existing devices. The present invention is capable of raising the wiper blade to move it away from the windshield when the wiper is not in use, and lowering the wiper blade to recontact the windshield when there is a need to use the wiper.

It is an object of the present invention to provide a wiper protection device which is capable of moving the wiper blade so that it is spaced from the windshield and will not deteriorate rapidly under the action of the sun, thereby lengthening the life span of the wiper blade.

Another object of the present invention is to provide a wiper protection device which will move the wiper blade away from the windshield when the wiper is not in use, and thus no dusts and dirts will be trapped in between the wiper blade and the windshield. Consequently, the windshield will not be scratched by the dust particles during the operation of the wiper.

BRIEF DESCRIPTION OF THE DRAWINGS

The above and other objects, as well as the features and advantages of the present invention will become apparent from the following detailed description of a preferred embodiment thereof in conjunction with the accompanying drawings in which.

DESCRIPTION OF THE PREFERRED EMBODIMENT

Figure 1:
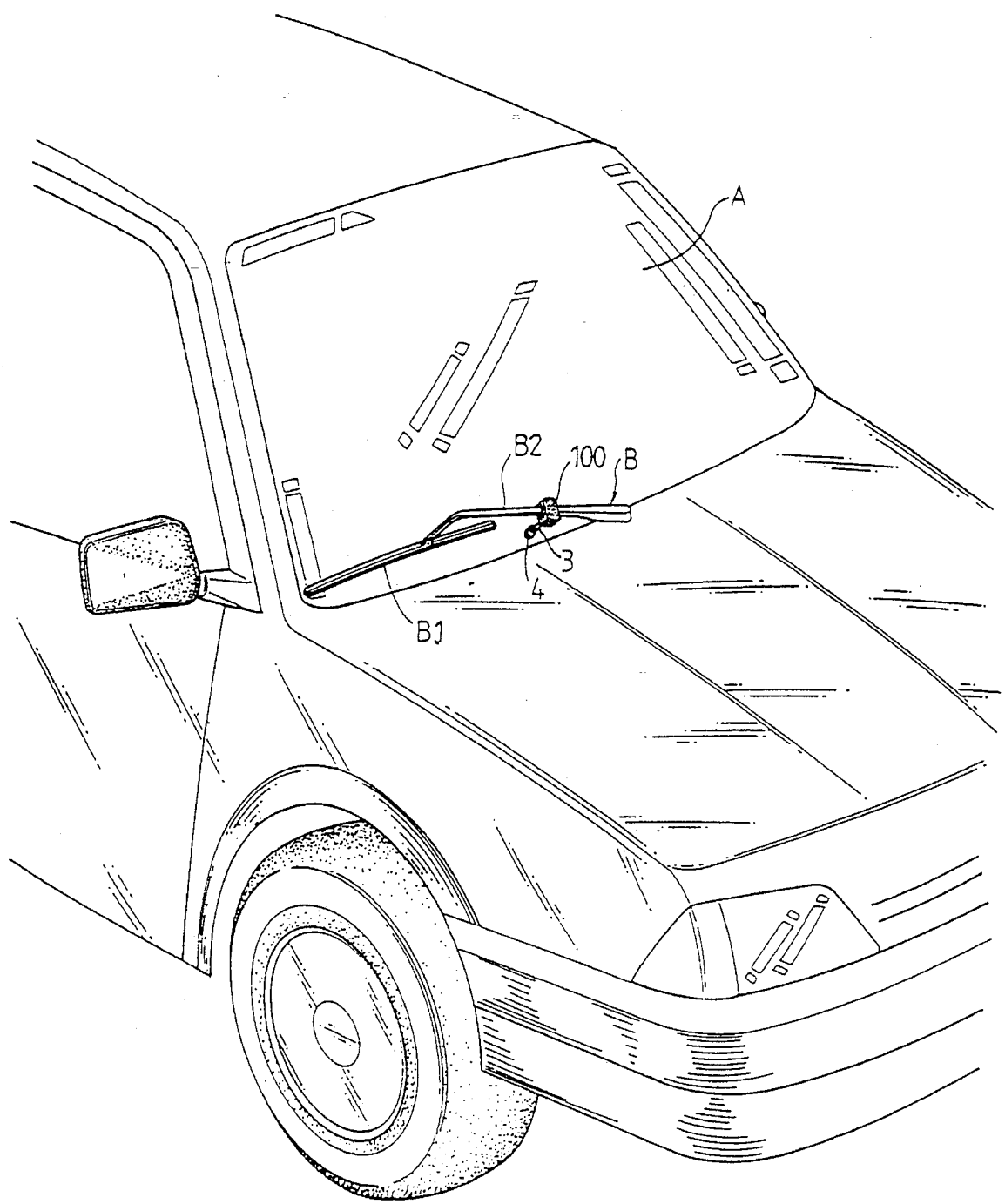
FIG. 1 is a schematic drawing illustrating the wiper protection device of the present invention installed on a windshield wiper for vehicles.

Referring to FIG. 1, it is an object of the present invention to provide a wiper protection device between the wiper B and windshield A, and which may raise the wiper blade B1 to be out of contact with the windshield A. The wiper protection device comprises a housing 100 mountable on the wiper arm B2, and a telescopic pusher rod 3 protruding from the housing 100 to urge against the windshield A when the wiper B is stationary, thereby forcing the wiper blade B1 to be spaced from the windshield due to the reaction force.

Figure 2:
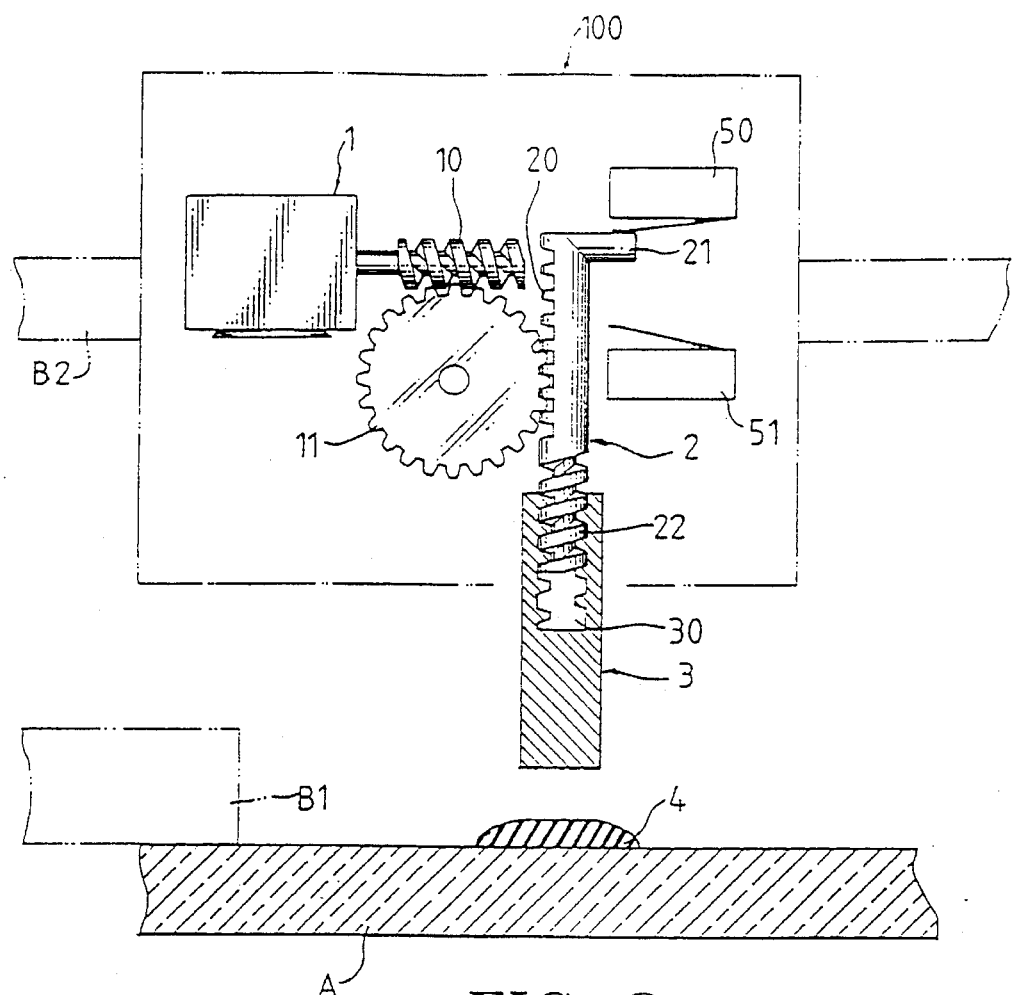
FIGS. 2 to 4 are cross section views of the wiper protection device according to the present invention, illustrating the respective operations of the device; and, FIG. 5 is a circuit diagram of the switch for the motor of the wiper protection device according to the present invention.

The housing 100 is mounted on the wiper arm B2. The housing 100 includes a set of driving means therein. As shown in FIG. 2, a DC motor 1 is located within the housing 100. The output shaft of the DC motor 1 is formed of a worm 10 which extends horizontally and engages a gear 11. The worm 10 is designed to drive the gear 11 so as to transmit power and reduce speed. The gear 11 in turn engages a rack 20 provided on one side of an actuating rod 2 which disposed at right angle to the worm 10. Due to the engagement between the rack 20 and gear 11, the actuating rod 2 will move upwards or downwards as gear 11 rotates counter-clockwise or clockwise respectively. The actuating rod 2 has a stop 21 at the top end thereof. A pair of switches 50 and 51 are provided at an upper and a lower positions which lie within the range in which the stop 21 will extend. The lower section of the actuating rod 2 is formed of a wormlike structure 22 which engages a telescopic pusher rod 3. The telescopic pusher rod 3 is the extension of the actuating rod 2, with one end thereof provided with a threaded hole 30 suitable for receiving the wormlike structure 22.

One end of the telescopic pusher rod 3 presses against the windshield when subject to a driving force. It is thus necessary to provide a cushion body between the windshield and pusher rod 3, so as to relieve the impact force resulted from each contact. In the preferred embodiment of the present invention, a soft, flat cushion pad 4 is provided. The cushion pad 4 is provided on the windshield A at a location on which the pusher rod 3 will urge. Alternatively, the cushion pad 4 can be disposed directly over the end of the pusher rod 3, which will also attain the same effect.

Figure 3:
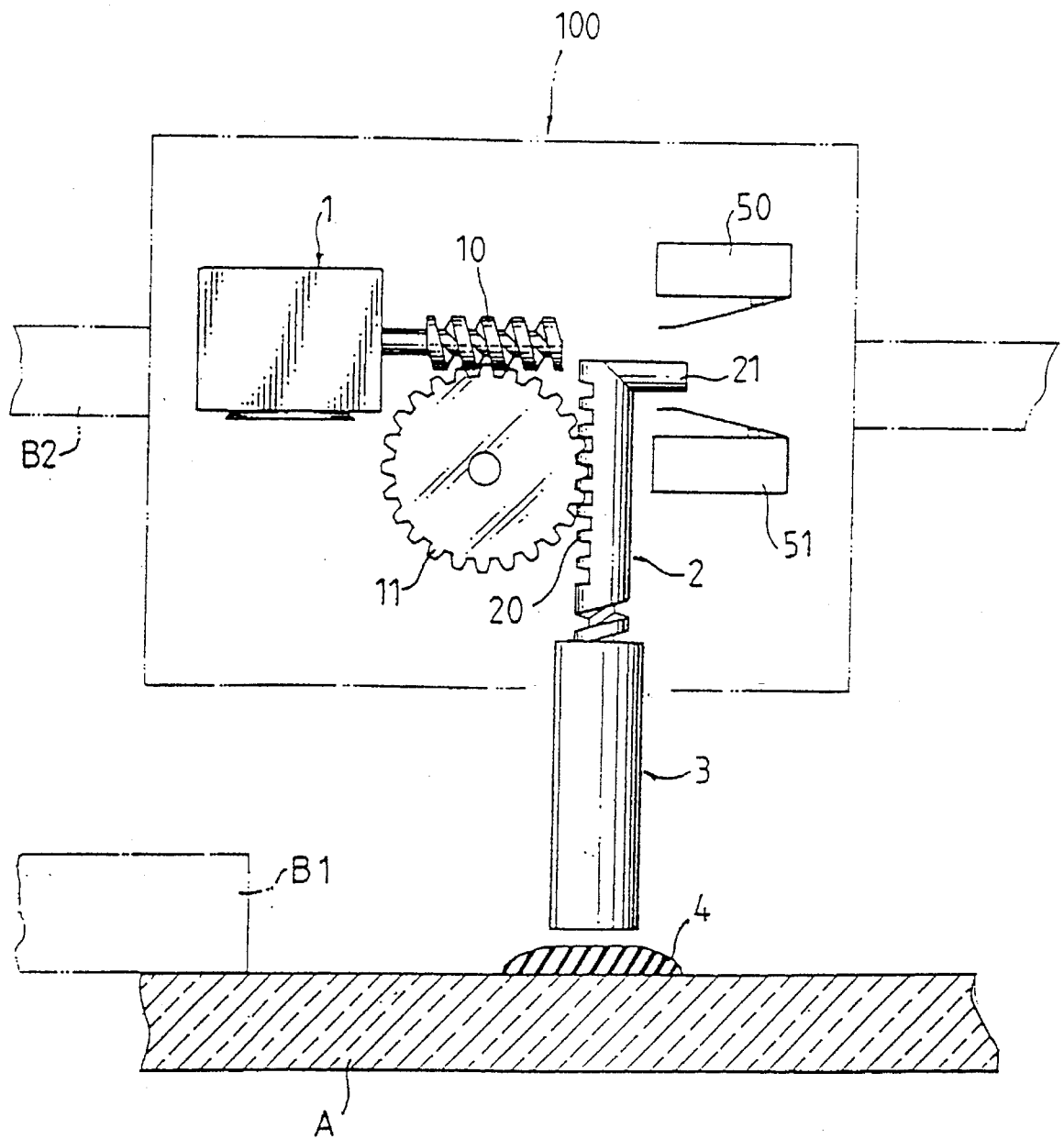
Figure 4:
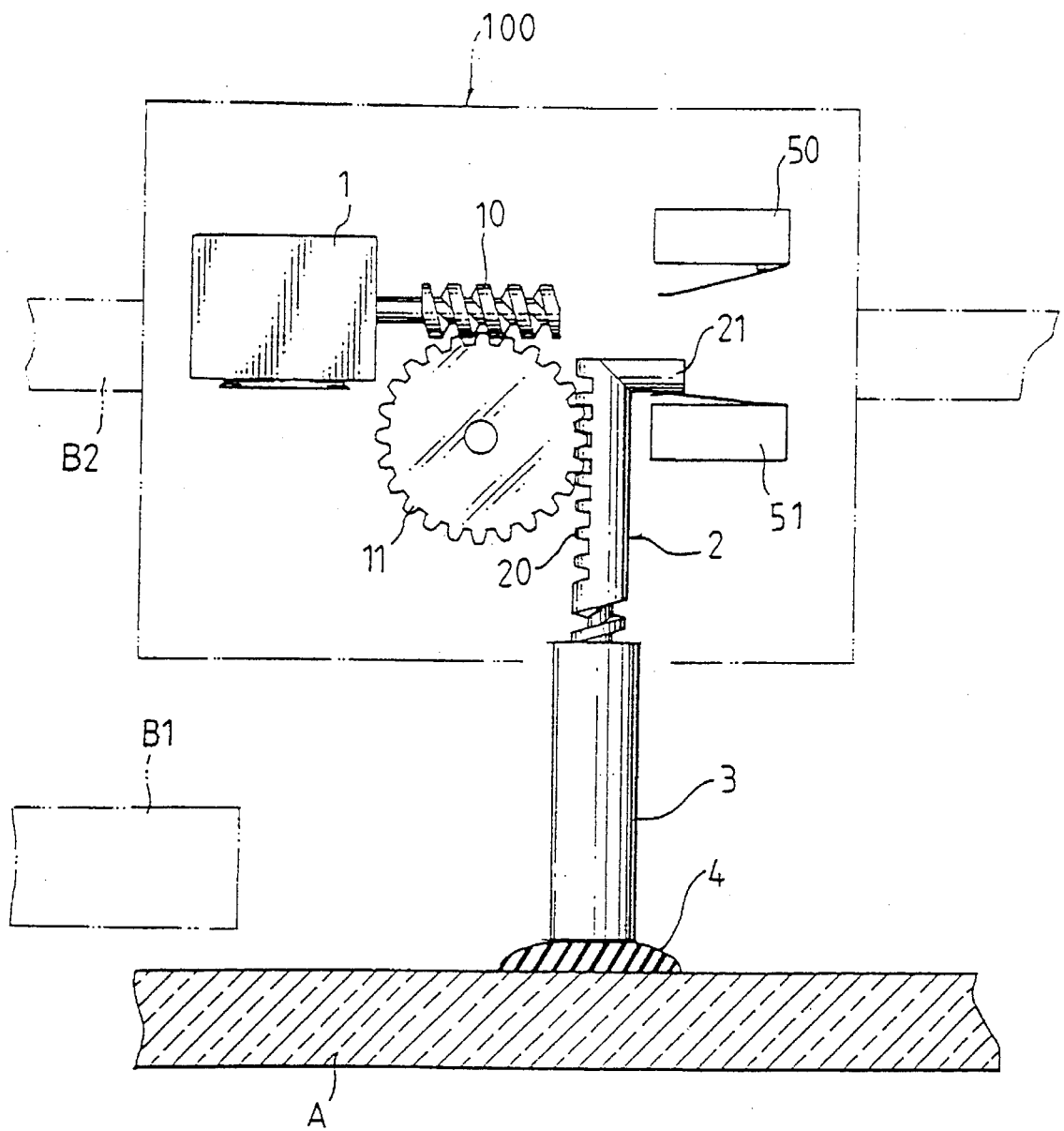

With reference to FIGS. 2, 3, and 4, D.C. motor 1 transmits power to the worm 10 and gear 11 which in turn effect the linear motion of the actuating rod 2 so that the pusher rod 3 will extend from or retract into the housing 100. When the pusher rod 3 extends and urges against the windshield A, the wiper B will be raised as a result of a reaction force, and thus the wiper blade B1 is spaced from the windshield A and will not be influenced by the excessively heated windshield A. Besides, since dust particles will not be trapped in between the wiper blade B1 and windshield A, the windshield will not be scratched by the dust particles.

The wiper protection device according to the present invention is designed to operate in response to the switching on and off of the vehicular ignition switch. In particular, when the ignition switch is turned on, the telescopic pusher rod 3 will retract into the housing 100, and the wiper blade B1 is lowered to rest on the windshield A and is ready for use. When the ignition switch is turned off, the telescopic pusher rod 3 will extend to urge against the cushion pad 4 located on the windshield, causing the wiper blade B1 to be raised and spaced from the windshield. Reviewing FIGS. 2, 3, and 4 in sequence, the drawings show the sequential operations of the wiper protection device wherein the wiper blade B1 is driven and raised to move away from the windshield. To the contrary, reviewing FIGS. 4, 3, and 2 in sequence, the drawings show the sequential operations of the wiper protection device wherein the wiper blade B1 is driven to be lowered and urged against the windshield.

Figure 5:
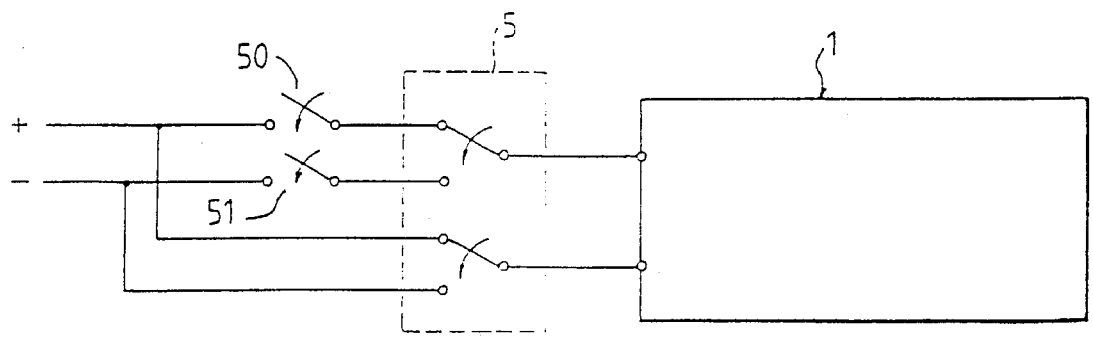

The wiper protection device according to the invention is connected to a double pole double throw switch 5 which is in turn electrically connected to the vehicular ignition system. As shown in FIG. 5 (taking in conjunction with FIGS. 2, 3, and 4), when the ignition switch is turned on, the double pole double throw switch 5 will provide a power supply to rotate the motor 1, and through the co-operative actions of the worm 10 and gear 11, the actuating rod 2 and thus the pusher rod 3 will retract into the housing 100, rendering the wiper blade B1 to be lowered and urge against the windshield. As the vehicle comes to a halt with the ignition switch turned off, the double pole double throw switch 5 will provide a power supply reversed in polarity to the previous one. The motor 1, at this instant, will be forced to rotate in a reverse direction, and the worm 10 and gear 11 actuated to move the pusher rod 3 downwards, which in turn causes the wiper blade B1 to be raised up with respect to the windshield A. The switches 50 and 51 will come in contact with the stop 21 as the same moves up and down, and close or open the circuit as the case may be. When the switch 50 comes in contact with the stop 21, the power supply intended for driving the motor will be cut off immediately, and the motor comes to a halt. At this point, the pusher rod 3 will stay at its final position. When the power of the vehicle is shut down, the double pole double throw switch 5 provides a power supply reversed in polarity to the previous one, and the pusher rod 3 will be driven again to move downwards. As the stop 21 moves away from the switch 50, the circuit will be closed again to provide the power to reignite the vehicle. Similarly, after the switch 51 is urged by the stop 21, the pusher rod 3 moving downwards will cease moving and stay at its final position until the vehicle resumes its power to run.

Alternatively, additional switches can be provided for the wiper protection device, so that the driver may actuate the device whenever necessary. Further, a known raindrop detector may be incorporated in the circuit.

The preferred embodiment is shown and described for illustrative purpose only and not in a limiting sense. Modifications and variations as well as alternative embodiments can be made by those skilled in the art without departing from the spirit of the present invention. It is intended that all such modifications, variations and embodiments are considered as being within the scope of the present invention.

What is claimed is:

1. In an automobile which includes a windshield and a windshield wiper assembly for wiping said windshield, said wiper assembly comprising:

a wiper blade engaging said windshield of said automobile, said wiper blade being supported by a windshield wiper arm, said arm mounted to said automobile for oscillating said blade over said windshield; the improvement comprising;

a wiper blade protection device for raising the blade so as to be spaced from the windshield when a vehicular ignition means of the automobile is shut off, said protection device comprising a housing mounted on the wiper arm, a DC motor provided in the housing, control means for controlling motor rotation in response to said vehicular ignition means, an elongated telescopic pusher rod mounted to said housing for linear movement, driving means coupling the motor to said pusher rod such that rotation of said motor causes said pusher rod to extend from or retract into the housing depending on motor rotation direction, extension of said pusher rod from said housing causing engagement of said pusher rod with said windshield, thereby raising the wiper arm and moving the wiper blade away from the windshield.

2. The automobile windshield wiper protection device according to claim 1, wherein the driving means includes an output shaft of the motor having a worm, a gear in engagement with said worm for speed reduction, and an actuating rod engaging the gear for effecting linear movement of said actuating rod, said actuating rod coupled to said pusher rod.

3. The automobile windshield wiper protection device according to claim 2, wherein the actuating rod includes stop means capable of touching first and second switches during the linear movement thereof, and power supplied by power means to the motor is being cut off when the first and second switches are touched by the stop means, said switches constituting part of said control means.

4. The automobile windshield wiper protection device according to claim 1, wherein said control means includes a double pole double throw switch electrically connected to a power supply means for the motor, the double pole double throw switch is electrically connected to the vehicular ignition means, and the double pole double throw switch is capable of transmitting a first power to rotate the motor when the vehicular ignition means is turned on, forcing the motor to rotate in a first direction, and transmitting a second power reversed in polarity to the first power when the vehicular ignition means is turned off, forcing the motor to rotate in a second direction opposite to the first direction, whereby the wiper blade is lowered to contact the windshield when the vehicular ignition means is turned on, and the wiper blade is raised to move away from the windshield when the power to the vehicle is cut off.

5. The automobile windshield wiper protection device according to claim 1, wherein a cushion pad is attached to the windshield at a location on which a tip of the pusher rod engages.

6. The automobile windshield wiper protection device according to claim 1, wherein a cushion pad is provided on a tip of the pusher rod.

7. The automobile windshield wiper protection device according to claim 2, wherein the actuating rod is threadably connected to the telescopic pusher rod at one end thereof, the actuating rod being threaded at the one end and the pusher rod having a threaded hole adapted to receive the threaded one end of the actuating rod.

* * * * *